Feb. 19, 1929.  
A. LINDEMANN  
1,702,835  
MACHINE FOR WELDING LAMP WIRES  
Filed Dec. 20, 1926  
4 Sheets-Sheet 1
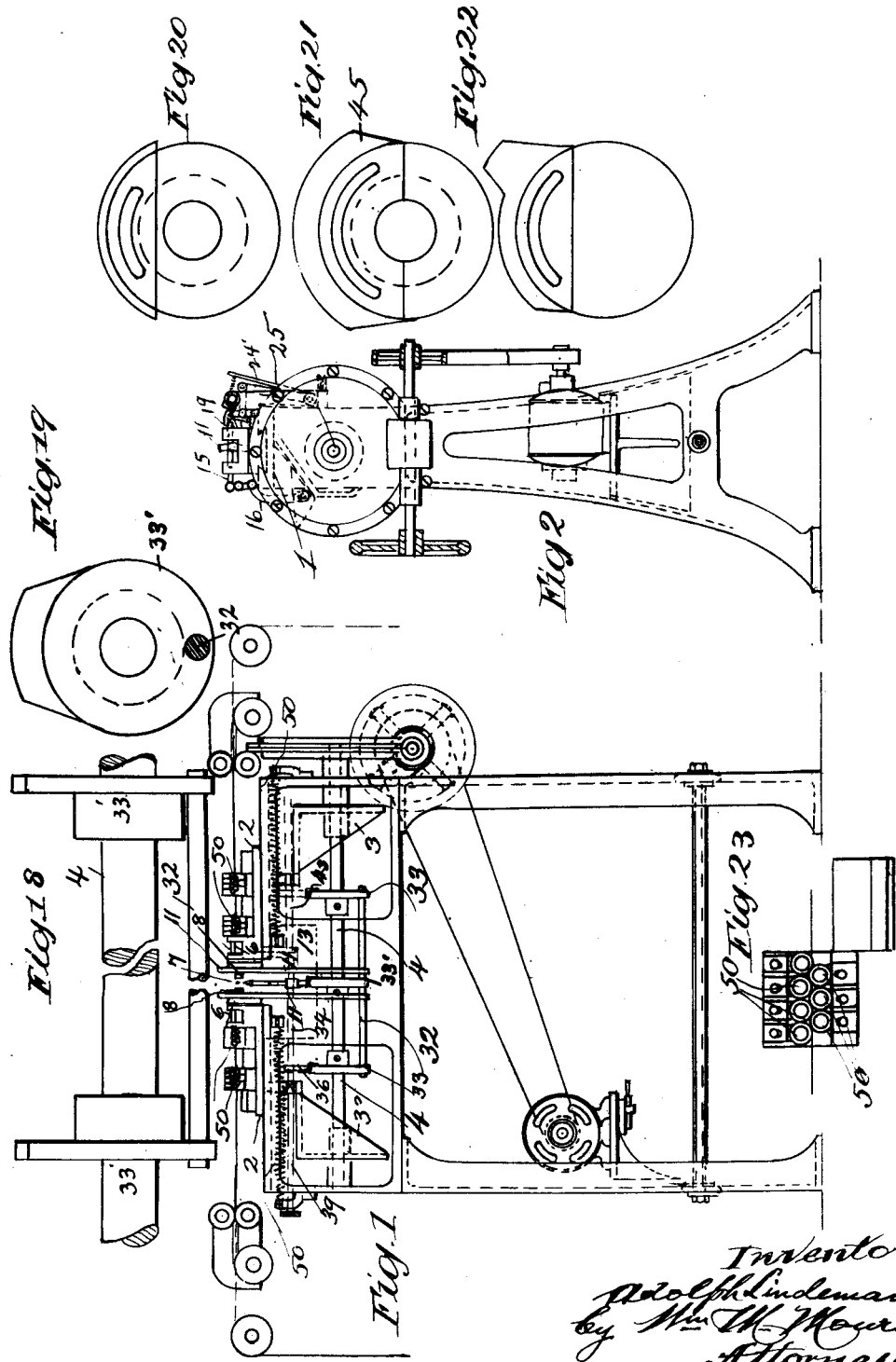

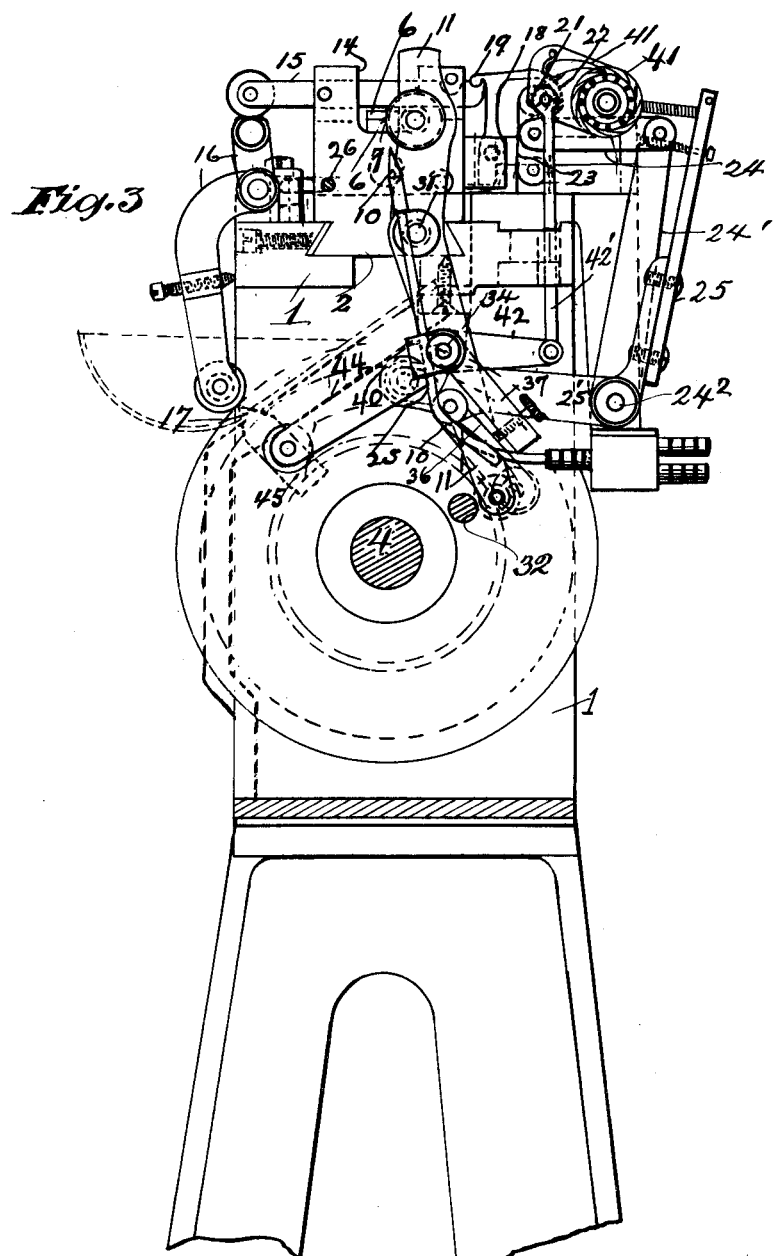

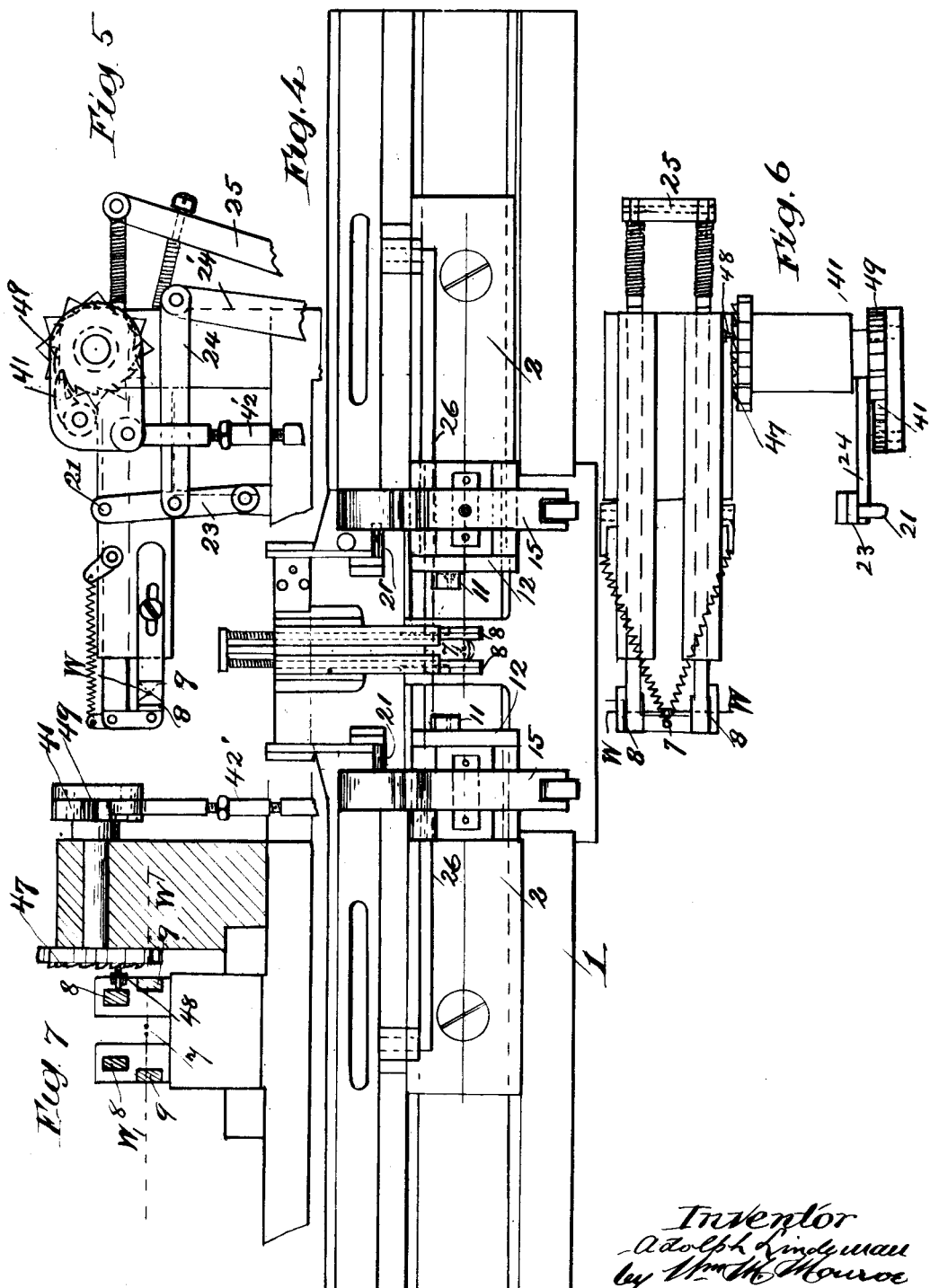

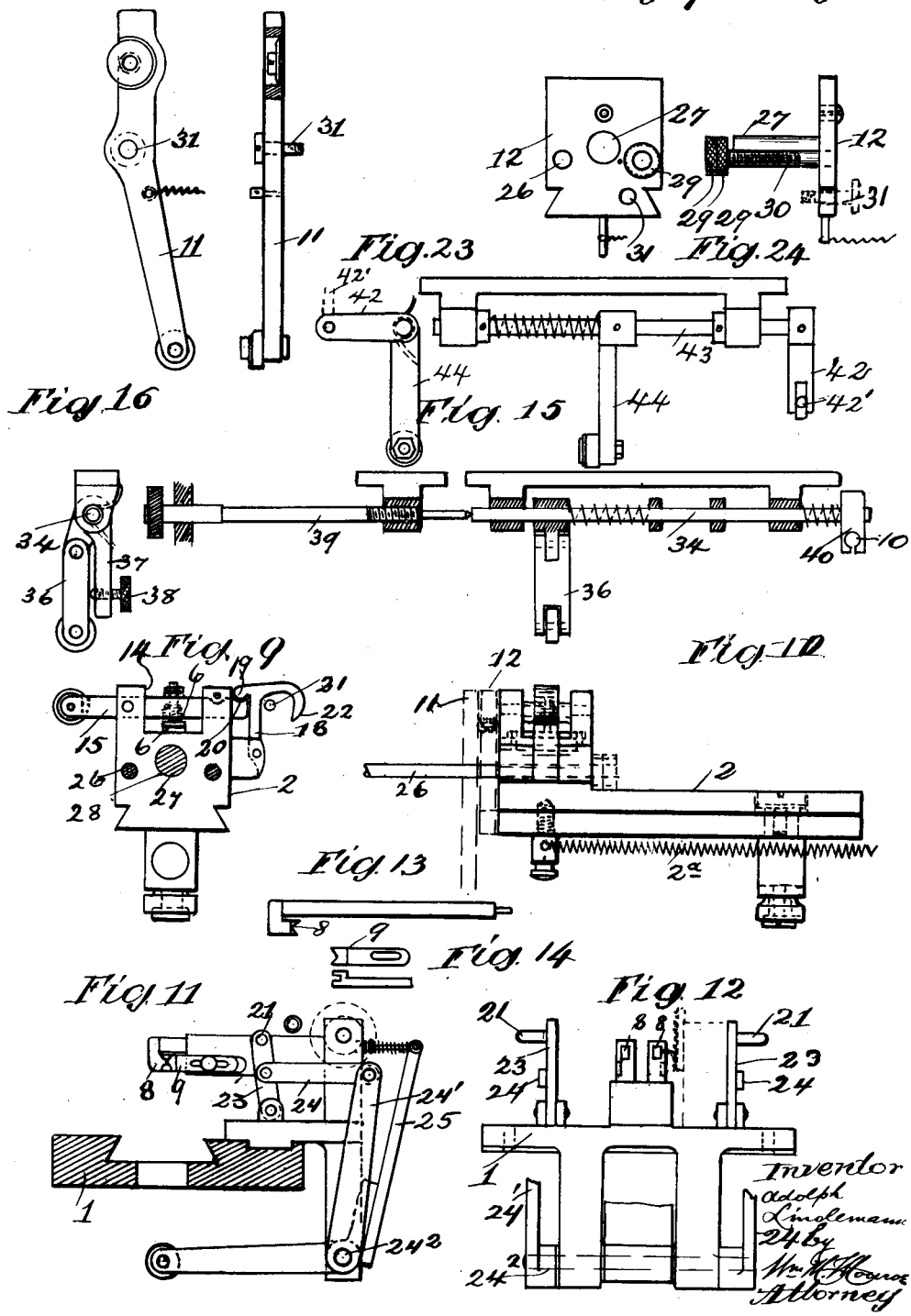

Patented Feb. 19, 1929.

1,702,835

UNITED STATES PATENT OFFICE.

ADOLPH LINDEMANN, OF PITTSBURGH, PENNSYLVANIA, ASSIGNOR TO EDITH J. CONWAY, OF CLEVELAND, OHIO.

MACHINE FOR WELDING LAMP WIRES.

Application filed December 20, 1926. Serial No. 155,956.

The objects of the invention are to provide an automatically acting machine for welding together the extremities of filament wires, which are composed of dissimilar metals, such as copper and nickel, to prepare them for placing in an incandescent lamp. In this machine an oxyhydrogen or other high temperature burner is provided, which instantly welds together the butted extremities of the wires. The invention includes a bed plate, mechanism movable thereon for simultaneously feeding the wires from opposite directions to a central point thereon, and butting them together without previous heating, means for clamping the wires in the butted position, locking means therefor, face plates adjustable in relation to the feed mechanism for determining the lengths of the severed wires, cutting mechanism for severing the respective wires, gripping means for holding the wires in their butted positions, and locking means for securing them in place before the acts of welding and severing them from the main wire take place.

The invention includes means for adjusting the positions of the face plates and for adjusting the positions of the knives or cutters, a burner tube, and cam mechanism for operating the various parts, and a main operating shaft therefor.

The invention also includes the combination and arrangement of the various parts and construction of the various details, hereinafter described, illustrated in the accompanying drawings, and specifically pointed out in the claims.

In the accompanying drawings Fig. 1 is a side elevation of the device;

Fig. 2 is an end elevation thereof.

Fig. 3 is a transverse section thereof showing the cam mechanism and lever arms for operating the various parts.

Fig. 4 is a plan thereof.

Fig. 5 is an enlarged side elevation of the gripping mechanism for one side of the machine.

Fig. 6 is a plan thereof and Fig. 7 is a transverse section thereof.

Figs. 8 and 8' are detail views in side and edge elevation, of one of the cutting knives.

Fig. 9 is an end elevation of one of the sliding heads showing the mechanism thereon for clamping.

Fig. 10 is a side elevation thereof.

Fig. 11 is a transverse section showing the gripping mechanism and showing the feeding head in dotted lines.

Fig. 12 is an end elevation showing the gripping mechanism in relation to other parts.

Figs. 13 and 14 show details of the gripping mechanism.

Fig. 15 is a longitudinal section showing adjusting means for the burner. Fig. 16, is a side elevation thereof.

Fig. 17 is a longitudinal section showing the operating shaft for the ratchet pawl.

Figs. 18, 19, 20, 21 and 22 are details of the several cams employed, and

Fig. 23 is a side elevation of the straightening rolls.

In these views 1 is the bed plate, 2, 2, are sliding heads thereon which are reciprocated towards and from each other by means of cams 3, 3, upon the driving shaft 4 and return springs 2ª.

At 5, 5, are shown feed rollers between which the wires are fed from opposite sides of the machine to the clamping plates, 6, 6, which secure the ends of the wires and carry them to the butted position at 7. (See Fig. 7.)

Here they are engaged between the grippers 8 and 9, which hold them securely in adjusted positions until the oxyhydrogen burner tube 10 rises and welds them together. This act takes place instantaneously and the burner then retires.

After welding, the cutter arms 11, 11, acting against face plates 12, 12, then sever the wires which fall into the receptacle 13, provided to receive them.

In Figs. 9 and 10 are shown details of the movable clamping heads, 2. Here one of these clamping plates 6 is shown mounted in a slot 14 in the head, and the other plate is resiliently mounted upon a rock arm 15 at one side of the head, which is operated by means of the rock arm 16, and a cam 17 upon the main shaft, as shown in Fig. 3.

When in clamped position the clamps are locked by means of the arm 18, having a T shaped lug thereon, one portion of which 19 enters the recess 20, in the arm 15, and retains it in place until the arm is released by the action of the pin 21, which moves in the overhanging curved extremity 22 and lifts the lug 19 out of the recess in the arm.

This action is accomplished by means of the rock arm 23, link 24, and arm 24', on the shaft 24². Simultaneously with locking the clamps the gripping spring pressed jaw 8, is released and forces the wire against the gripping jaw 9.

The jaw 8 is afterwards moved out of engagement with the other jaw by means of the arm 25 upon the main shaft.

A cam 25 operates the arms 25 and 24'.

The face plates 12, 12, are slidably mounted upon the rod 26, secured upon the bed plate, and are finally adjustable by means of the center wrist 27, movable in an opening 28, in the head, and the clamping nuts 29, 29, upon the rod 30, projecting from the plate.

The cutters are mounted upon the shafts 31, 31, in the face plates and are operated by means of the rod 32, connecting the discs 33, 33, once in each revolution of the main shaft.

The burner tube 10 is mounted upon a shaft 34, and is raised and lowered by means of the cam 35 located centrally of the machine upon the main driving shaft 4, and arm 36 pivoted upon a bracket 37 and adjustable at 38. See Figs. 15 and 16. This shaft is adjustable by means of the screw threaded adjusting shaft 39 to position the clamp 40 which holds the burner tube correctly. See Figs. 15 and 16.

The locking means for the side grippers, 8 and 9 is shown in Figs. 5, 6 and 7, and comprises the pawl 41 and ratchet 49 operated by the rock arm 42, rod 42' and spring pressed shaft 43, and arm 44 and cam 45. The rack 47 engages with the brake pin 48 which locks the gripping bar 8.

Wire guiding and straightening rolls 50, 50, are employed previous to introducing the wires into the clamps in the reciprocating heads to insure their perfect alinement with each other and to avoid a wavy condition of the wires.

Having described the invention what I claim as new and desire to secure by Letters Patent is—

1. In a device of the character described, a bed plate, wire holding heads reciprocable thereon towards and from each other, clamping means in said heads, said clamping means being positioned to abut the ends of said wires together, means for operating said clamping means upon the advance movement of said heads and means for gripping said wires adjacent to their abutted ends, to retain them in butted position, a burner tube or nozzle, and means for bringing said burner tube into position for welding said butted ends together.

2. In a device of the character described, a bed plate, wire holding heads reciprocable thereon towards and from each other, clamping means in said heads, said clamping means being positioned to abut the ends of said wires together, means for operating said clamping means upon the advance movement of said heads, and means for gripping said wires adjacent to their abutted ends to retain them in butted position, a burner tube or nozzle, and means for bringing said burner tube into position for welding said butted ends together, means for withdrawing said heads, and means for releasing said gripping means, and means for releasing said clamping means, prior to the withdrawal of said heads.

3. In a device of the character described, a bed plate, opposed wire propelling heads longitudinally movable towards and from each other thereon, a wire clamping device in each head, a face plate adjustably secured upon the inner end of each head, and cutters pivoted on said face plates, a movable burner, and means for operating said heads and clamping devices to butt the ends of said wires together when they arrive in the path of said burner, and subsequently acting means for operating said cutters to sever said wires against said face plates.

4. In a device of the character described, opposed wire carrying clamping heads, face plates upon the adjacent ends of said heads, means for adjusting said face plates upon said heads, cutter arms bearing cutters, said cutter arms being pivoted in said face plates, and laterally adjustable gripping jaws, said clamping heads serving to bring the opposed wires into butted position with each other and said gripping means serving to retain said wire ends in said butted position, said clamping heads serving to bring opposed wires in a cold condition into butted position with each other and said gripping means serving to retain said wire ends in said butted position, and a periodically moving burner for applying a welding flame to said butted ends, and means for operating the same.

5. In a device of the character described, opposed wire carrying clamping heads, face plates upon the adjacent ends of said heads, means for adjusting said face plates upon said heads, cutter arms bearing cutters, said cutter arms being pivoted in said face plates, and laterally adjustable gripping jaws, said clamping heads serving to bring the opposed wires into butted position with each other and said gripping means serving to retain said wire ends in said butted position, and means for applying a welding flame to said butted ends.

6. In an automatically acting device of the character described, opposed wire carrying clamping heads, face plates upon the adjacent ends of said heads, means for adjusting said face plates upon said heads, and cutter arms bearing cutters, said cutter arms being adjustable relatively to said face plates, laterally adjustable gripping means, said clamping heads serving to bring the opposed wires into butted position to each other and said gripping means serving to retain said wire ends in said butted position, and a burner tube for welding said butted wire ends together, means for reciprocating said clamping heads, means for operating said gripping means, subsequently acting means for raising said burner into position to weld the extremities of said wires, and subsequently acting means for operating said cutters.

7. In a wire welding machine wire receiving clamps, reciprocable towards and from each other, a gripping device upon each side of the point of welding to secure the butted ends of the wire in alinement with each other, a burner nozzle movable towards and from said point of welding, face plates adjustable upon and movable with said reciprocable clamps, and cutters pivoted in said face plates.

8. In a wire welding machine in combination, means for feeding simultaneously opposed wires into a butted position relative to each other in a cold state, means for gripping the wires in their butted position, means for locking the gripping means, a burner and means for periodically advancing the burner to effect the welding of said butted wires.

9. In a wire welding machine in combination, means for simultaneously feeding opposed wires to a butted position, means for securing them in said butted position, a burner, and cam means for periodically advancing the same to weld the butted ends of said wires together, and means for straightening the wires prior to feeding the same together.

10. In a welding machine, means for straightening the wires, means for simultaneously feeding the same into alined and butted position relative to each other, means located on each side of said butted position for rigidly securing said wires, and means for applying a welding flame to said butted wires.

In testimony whereof I hereunto affix my signature.

ADOLPH LINDEMANN.